United States Patent Office 3,205,206
Patented Sept. 7, 1965

3,205,206
MODIFYING POLYMERS
Arnold F. Marcantonio, Wilmington, Del., assignor to Hercules Powder Company, Wilmington, Del., a corporation of Delaware
No Drawing. Filed Oct. 15, 1962, Ser. No. 230,679
18 Claims. (Cl. 260—88.2)

This invention relates to a process of modifying polymers and to the polymers so modified. In particular, this invention relates to the process of modifying hydrocarbon polymers with aryl monoazides and to the polymers so modified.

Recent improvements in the art of polymerization have enabled the production of a large number of hydrocarbon polymers having a variety of uses. All of these polymers, while excellent for many uses, are difficult to dye, emulsify, adhere to other materials, etc. It has been hypothesized that the reason for these difficulties is the lack of polar groups in the polymers.

Now in accordance with this invention, it has been found that hydrocarbon polymers can be modified with aryl monoazides having the formula $RN_3$, where R is an aromatic grouping, to produce products having increased susceptibility toward the application of dyes, coatings, adhesives, as well as improved printability and emulsifiability. The modification of this invention is particularly advantageous in the preparation of hydrocarbon polymer films and fibers of improved dyeability. It has also been found that hydrocarbon polymers modified in accordance with this invention make excellent lubricant additives. In addition, it is possible by means of this invention to bond directly to hydrocarbon polymers aryl dyes, stabilizers, flame-proofing agents, antistatic agents, ultraviolet screening agents, etc., which could otherwise not be used. This can be done by using a compound which, in addition to the color, stability, etc., causing grouping, has been synthesized to contain an azide grouping.

Any aryl monoazide as defined above can be used in the process of this invention. Exemplary of the aryl monoazides that can be used are the unsubstituted aryl monoazides such as phenyl azide, β-naphthyl azide, 4-azido diphenyl, etc.; halogenated aryl monoazides such as 2,4-dichlorophenyl azide, etc.; nitroaryl monoazides such as p-nitrophenyl azide, etc.; carboxyl aryl monoazides such as m-azidobenzoic acid, etc.; hydroxy aryl monoazides such as m-azidophenol, etc.; heterocyclic substituted aryl monoazides such as 8-azidocarbazole, 2-(p-azidophenyl)-6-methylbenzothiazole, etc.; amino aryl monoazides such as 4-azido diphenylamine, p-azidobenzene sulfamide, etc. Most preferably, functional groups will be attached to the aryl monoazide in the meta- or para-positions. The only restriction on the type of aryl azide used in the process of this invention is that it be substituted with only one azide group.

Any type of hydrocarbon polymer, including saturated, unsaturated, linear atactic, crystalline or nonlinear amorphous polymers as, for example, polyethylene, polypropylene, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc., and blends of these polymers with each other or nonhydrocarbon polymers can be modified in accordance with this invention. The hydrocarbon polymer to be modified can be in any desired form as, for example, flake, fiber, film, etc.

The modification process of this invention can be carried out by either heating the hydrocarbon polymer in the presence of the aryl monoazide to a temperature at which the aryl monoazide decomposes or by exposing the polymer in the presence of the aryl monoazide to irradiation. The temperature at which modification is effected can be varied over a wide range. When modification is effected by heating, the temperature varies from about 90° C. to about 300° C. When modification is effected by irradiation, it is independent of temperature and can be performed at or below room temperature. Under irradiation conditions, the rate of the reaction depends on the intensity of the light source and the distance of the polymer therefrom. The wave lengths used will generally be in the range of from about 0.01 A. to about 7600 A. and most preferably from about 3200 A. to about 5800 A. This irradiation can be supplied by sources such as low and high pressure mercury vapor lamps, cathode ray tubes, etc. Various amounts of the aryl monoazide modifying agent can be added, the optimum amount depending on the desired degree of modification, the specific aryl monoazide employed, etc. In general, the amount added, based on the weight of the hydrocarbon polymer, will be from about 0.001% to about 20%.

The aryl monoazide modifying agent can be incorporated with the hydrocarbon polymer in any desired fashion. For some applications, it may be desirable to blend the modifier and hydrocarbon polymer. In such cases, a uniform blend can be obtained by simply milling on a conventional rubber mill or dissolving the aryl monoazide in a solution containing the polymer and evaporating the solvent. For other applications, a surface modification of the polymer may be desired. In such cases, the polymer to be treated can be dipped into a solution of the aryl monoazide or a solution of the aryl monoazide can be sprayed or painted on the surface of the polymer. Other methods of blending the modifying agent with the polymer or coating the surface of the polymer with the modifying agent will be apparent to those skilled in the art.

In addition to the modifying agent, other ingredients can also be incorporated as, for example, extenders, fillers, pigments, plasticizers, stabilizers, etc. When the modification is effected by irradiation, additives should be used in amounts which do not inhibit the passage of the radiation. Obviously there are many cases in which additives are not required or desired and excellent results are achieved when only the modifying agent is added.

The following examples are presented for purposes of illustration, parts and percentages being by weight unless otherwise specified. The molecular weight of some of the polymers in the examples is indicated by their reduced specific viscosity (RSV). By the term "reduced specific viscosity" is meant the $\eta_{sp/c}$ determined on a 0.1% solution (0.1 g. of the polymer per 100 ml. of solution) of the polymer in decahydronaphthalene at a temperature of 135° C.

*Example 1*

A sample of finely divided polypropylene having an RSV of 3.9 was slurried in methylene chloride. To this slurry was added sufficient m-azidobenzoic acid to give a mixture containing 3% by weight of aryl azide based on the weight of the polymer. The methylene chloride diluent was evaporated at room temperature with agitation. The resulting mixture was heated to a temperature of 150° C. for 4 hours under an amosphere of nitrogen. The product was then extracted with acetone to remove any unreacted materials. The modified polymer product was a free flowing powder having an RSV essentially the same as the untreated polymer. It was analyzed for nitrogen to determine the amount of modification. The results of this analysis showed that the polymer contained 0.09% by weight of nitrogen.

*Example 2*

A sample of polyisobutylene having an average molecular weight of approximately 10,800 was dissolved in methylene chloride. To this solution was added sufficient phenyl azide to give a mixture containing 5.2% by weight of the aryl azide based on the weight of the polymer. The methylene chloride diluent was evaporated at room temperature. The resulting mixture was heated at a temperature of 150° C. for 12 hours under an atmosphere of nitrogen. The product was then dissolved in hexane and precipitated with methanol to remove any unreacted azide or decomposition products. The resulting modified polymer contained 0.06% by weight of nitrogen and was polymer contained 0.39% by weight of nitrogen.

*Example 3*

A sample of an ethylene-propylene copolymer having an RSV of 1.9 and containing 31 mole percent of propylene was modified with phenyl azide. The aryl azide was added to a solution of the copolymer in carbon tetrachloride in an amount of 10 parts per 100 parts of copolymer and the solvent was allowed to evaporate overnight at room temperature to form a thin film. The film was then irradiated for 7 hours at a temperature of 28° C. under an atmosphere of nitrogen with a high pressure mercury vapor light (100 watts) at 110 volts at a distance of 6 inches. The light emitted wave lengths of from 3200 A. to 7600 A. Quartz equipment was used throughout the reaction. The product was extracted with acetone to remove any unreacted materials. The resulting modified polymer contained 0.39% by weight of nitrogen.

*Example 4*

A sample of polypropylene fibers having an RSV of 3.7 was thoroughly washed, rinsed in distilled water and dried. The dried fibers were then soaked in a 20% solution of 2,4-dichlorophenyl azide in chloroform for 7 hours at room temperature. After drying, the thus treated fibers were heated in an autoclave in an atmosphere of nitrogen for 4 hours at a temperature of 145° C. under a pressure of 50 p.s.i. The fibers were extracted with chloroform to remove any unreacted azide or decomposition products. The resulting modified fibers contained 0.05% by weight of nitrogen. When dyed with acid dyes, the modified fibers gave deeper shades of color than unmodified fibers.

What I claim and desire to protect by Letters Patent is:

1. The process of modifying a hydrocarbon polymer which comprises heating said polymer at a temperature between about 90° C. to about 300° C. with from about 0.001% to about 20% of an aryl monoazide having the formula $RN_3$, where R is an aromatic grouping.

2. The process of claim 1 wherein the aryl monoazide is phenyl azide.

3. The process of claim 1 wherein the aryl monoazide is m-azidobenzoic acid.

4. The process of claim 1 wherein the aryl monoazide is 2,4-dichlorophenyl azide.

5. The process of claim 1 wherein the hydrocarbon polymer is polypropylene.

6. The process of claim 1 wherein the hydrocarbon polymer is polyisobutylene.

7. The process of modifying a hydrocarbon polymer which comprises irradiating said polymer in admixture with from about 0.001% to about 20% of an aryl monoazide having the formula $RN_3$, where R is an aromatic grouping, said irradiation being conducted at a wave length between about 0.01 A. and about 7600 A.

8. The process of claim 7 wherein the aryl monoazide is phenyl azide.

9. The process of claim 7 wherein the hydrocarbon polymer is ethylene-propylene copolymer.

10. A hydrocarbon polymer modified by treating with from about 0.001% to about 20% of an aryl monoazide at an elevated temperature, said aryl monoazide having the formula $RN_3$, where R is an aromatic grouping.

11. The product of claim 10 wherein the aryl monoazide is phenyl azide.

12. The product of claim 10 wherein the aryl monoazide is n-azidobenzoic acid.

13. The product of claim 10 wherein the aryl monoazide is 2,4-dichlorophenyl azide.

14. The product of claim 10 wherein the hydrocarbon polymer is polypropylene.

15. The product of claim 10 wherein the hydrocarbon polymer is polyisobutylene.

16. A hydrocarbon polymer modified by treating with from about 0.001% to about 20% of an aryl monoazide having the formula $RN_3$, where R is an aromatic grouping, under irradiation at a wave length between about 0.01 A. and about 7600 A.

17. The product of claim 16 wherein the aryl monoazide is phenyl azide.

18. The product of claim 16 wherein the hydrocarbon polymer is ethylene-propylene copolymer.

References Cited by the Examiner

UNITED STATES PATENTS 2,852,379   9/58   Hepher et al. _____ 96—33

JOSEPH L. SCHOFER, *Primary Examiner.*

UNITED STATES PATENT OFFICE
CERTIFICATE OF CORRECTION

Patent No. 3,205,206 September 7, 1965

Arnold F. Marcantonio

It is hereby certified that error appears in the above numbered patent requiring correction and that the said Letters Patent should read as corrected below.

Column 3, line 11, strike out "polymer contained 0.39% by weight of nitrogen", and insert instead -- found to be useful as a lubricant additive --.

Signed and sealed this 29th day of March 1966.

(L)

st:

EST W. SWIDER
iting Officer

EDWARD J. BRENNER
Commissioner of Patents